(12) United States Patent
Goudarzi et al.

(10) Patent No.: US 12,530,199 B2
(45) Date of Patent: Jan. 20, 2026

(54) SYSTEMS AND METHODS FOR LOAD-DEPENDENT-BRANCH PRE-RESOLUTION

(71) Applicant: HUAWEI TECHNOLOGIES CO., LTD., Shenzhen (CN)

(72) Inventors: Maziar Goudarzi, Toronto (CA); Julian Humecki, Etobicoke (CA); Reza Azimi, Aurora (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 219 days.

(21) Appl. No.: 17/708,637

(22) Filed: Mar. 30, 2022

(65) Prior Publication Data

US 2023/0315476 A1 Oct. 5, 2023

(51) Int. Cl.
 *G06F 9/38* (2018.01)
 *G06F 9/30* (2018.01)
(52) U.S. Cl.
 CPC ........ *G06F 9/3844* (2013.01); *G06F 9/30043* (2013.01); *G06F 9/30065* (2013.01); *G06F 9/3806* (2013.01)
(58) Field of Classification Search
 CPC .... G06F 9/3802; G06F 9/3806; G06F 9/3836; G06F 9/3844
 See application file for complete search history.

(56) References Cited

U.S. PATENT DOCUMENTS

| 4,991,080 A | * | 2/1991 | Emma | G06F 9/3877 719/310 |
| 2001/0037447 A1 | * | 11/2001 | Mukherjee | G06F 11/1405 712/235 |

OTHER PUBLICATIONS

Farcy et al., "Dataflow Analysis of Branch Mispredictions and Its Application to Early Resolution of Branch Outcomes", IEEE, 1998, 10 pages.*
Sundaramoorthy et al., "Slipstream Processors: Improving both Performance and Fault Tolerance", 2000, pp. 257-268.*
Zilles et al., "Execution-based Prediction Using Speculative Slices", 28th Annual International Symposium on Computer Architecture (ISCA 2001), Jul. 2001, pp. 1-12.*
Koppelman, "Early Branch Resolution using a Fast Pre-Execution Core on a Dynamically Scheduled Processor", pp. 1-13.*
Pruett et al., Branch Runahead: An Alternative to Branch Prediction for Impossible to Predict Branches, MICRO Oct. 18-22, 2021.
Farooq et al., Store-Load-Branch (SLB) Predictor: A Compiler Assisted Branch Prediction for Data Dependent Branches, HPCA, 2013.

(Continued)

*Primary Examiner* — David J. Huisman

(57) ABSTRACT

A method of branch prediction includes, in a pre-execute loop, loading a series of instructions leading to a load dependent branch (LDB) instruction including a load instruction, executing the load instruction to receive a part of a branch condition, computing a branch outcome of the LDB instruction based on the branch condition, and storing the branch outcome to a branch-outcome memory. Then, in a main loop corresponding to the pre-execute loop, the method includes loading the LDB instruction, reading the branch outcome from the branch-outcome memory, and executing the main loop based on the branch outcome. In some cases, the method, in the main loop, computes the branch outcome of the branch condition LDB instruction again.

12 Claims, 13 Drawing Sheets

(56) References Cited

OTHER PUBLICATIONS

Sridhar et al., Load Driven Branch Predictor (LDBP), UCSC, Sep. 18, 2020.
Srinivasan et al., Slipstream Processors Revisited: Exploiting Branch Sets, ISCA 2020.
Chappel et al., Simultaneous Subordinate Microthreading, SSMT, ISCA, 1999.

* cited by examiner

SYSTEMS AND METHODS FOR LOAD-DEPENDENT-BRANCH PRE-RESOLUTION

CROSS-REFERENCE TO RELATED APPLICATIONS

This is the first application filed for the present invention.

TECHNICAL FIELD

The present disclosure pertains to the field of software branch prediction, and in particular to methods and systems for improving branch prediction in the case of load-dependent branches (LDBs).

BACKGROUND

Branch prediction is an important feature of modern pipelined computer architectures and is required to achieve high performance. An accurate branch-prediction feature keeps the processor pipeline healthily fed with new instructions and limits the performance hit when a branch is mis-predicted. There are many techniques for branch-prediction, most based on history based mechanisms.

One type of branch is a load-dependent branch (LDB) where a variable to be evaluated in the branch instruction must first be loaded before the evaluation can occur. Most present day conventional branch-prediction methods perform poorly on LDBs. One reason is that many LDBs in modern workloads exhibit little historical behavior, locally or globally. Another reason is that the load may miss in a local cache and the time required to fetch the data on a cache miss is long.

Therefore, there exists a need for improved methods of branch prediction that perform well on LDBs, and obviates or mitigates one or more deficiencies of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide methods and apparatus to produce a computer system with improved accuracy of load dependent branch (LDB) instructions using a combination of software, compiler technology, and hardware support. In embodiments, the LDB instruction and its associated load instruction may be executed in a pre-execute loop to determine the branch outcome of the LDB instruction. In cases where the LDB instruction is in a loop, the branch outcomes for each execution of the loop may be determined in advance. Once branch outcomes have been determined, the loop may be executed as a main loop. When the program executes the LDB instruction, the processor core's branch prediction unit (BPU) may retrieve the pre-computed branch outcome and use this value as a predicted value of the branch to provide highly accurate branch predictions.

In accordance with embodiments of the present invention, there is provided a method of branch prediction. The method includes, in a pre-execute loop, executing a series of instructions leading to a load dependent branch (LDB) instruction, including a load instruction. The method further includes executing the load instruction to receive a part of a branch condition. The method also includes computing a branch outcome of the LDB instruction based on the branch condition, and storing the branch outcome to a branch-outcome memory. The method also includes, in a main loop corresponding to the pre-execute loop, loading the LDB instruction, reading the branch outcome from the branch-outcome memory, and executing the main loop based on the branch outcome.

This provides the technical benefit of pre-computing all branch outcomes leading to a possibility of 100% accurate branch prediction of the loop.

Embodiments further include, in the main loop, computing the branch outcome of the branch condition.

This provides the technical benefit of allowing the processor core to use the branch outcome as a hint rather than being required to use it.

In further embodiments, the branch outcome is provided to the branch-outcome memory through a branch-outcome write instruction. The branch-outcome write instruction includes a program counter (PC) of the LDB instruction and the branch outcome.

In further embodiments, the branch outcome is written using a branch-outcome side-channel stream (BOSS) write instruction. The BOSS write instruction includes a program counter (PC) of the LDB instruction and the branch outcome.

In further embodiments, the BOSS write instruction comprises two instructions, a first instruction for transferring the PC of the LDB instruction and a second instruction for transferring the branch outcome.

In further embodiments, the branch outcome is read using a branch branch-outcome side-channel stream (BOSS) read instruction. The branch BOSS read instruction includes a label of a branch target address to be used when the LDB instruction is taken.

The use of dedicated instructions provides the technical benefit of specific instructions to provide the software-hardware interface required rather than attempting to use combinations of multiple pre-existing instructions.

Embodiments further include, in the main loop, determining that the branch outcome is valid.

This provides the technical benefit of making it easier to manage branch outcomes before acting on them.

In further embodiments, the branch-outcome memory is a FIFO. Using a FIFO provides the technical benefit that the required hardware and firmware to manage a FIFO is well known in the art.

In accordance with embodiments of the present invention, there is provided a processor core including an instruction fetch and decode stage including a branch prediction unit (BPU), an execution stage, a register file, a commit stage, and a branch-outcome memory. The processor core is configured so that in response to receiving a branch-outcome write instruction the processor core writes a branch outcome to the branch-outcome memory. The BPU is configured so that in response to the instruction fetch and decode stage receiving a load dependent branch (LDB) instruction, the BPU reads the branch outcome from the branch outcome memory allowing the CPU using the branch outcome to predict the LDB instruction.

The use of dedicated hardware resources provides the technical benefit of implementing the branch predictions methods described herein without incurring unnecessary overhead.

Embodiments further include a register file with the branch outcome being first stored in the register file before being written to the branch-outcome memory by the commit stage.

In further embodiments, the commit stage includes a branch squash detection unit and a branch commit detection unit used to detect the LDB instruction.

In further embodiments, the instruction fetch and decode stage further includes a branch outcome consumption control unit.

The use of dedicated hardware units in the processor core provides the technical benefit of supporting features such as out-of-order execution and target-branch instructions.

In further embodiments, the branch-outcome write instruction comprises a program counter of a target LDB instruction.

In accordance with embodiments of the present invention, there is provided a method of branch prediction. The method includes loading a sequence of instructions leading to a load dependent branch (LDB) instruction of an instruction loop where the sequence of instructions leading to the LDB instruction includes a load instruction. Also, sending an instruction sequence of the loop to a hardware unit and selectively executing, by the hardware unit, the instruction sequence for each iteration of the instruction loop.

In further embodiments, sending the instruction sequence includes sending a program counter (PC) of the LDB instruction.

In further embodiments, the instruction sequence is sent using a branch-outcome side-channel stream (BOSS) slice instruction, the BOSS slice instruction includes the PC and the sequence of instructions leading to the LDB instruction includes the load instruction. The use of a hardware driven mode provides the technical benefit of reducing instruction overhead and provides the ability to only utilize methods of branch prediction described herein as required.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present disclosure are related to methods and apparatus to address issues of branch prediction of hard-to-predict load-dependent branches (LDBs) by pre-resolving branch outcomes via a software-provided pre-execute loop or hardware executed code-slices. Embodiments include a branch-outcome side-channel stream (BOSS) channel as a bridge to transfer the outcomes of branches from software to a branch-prediction unit (BPU) in hardware. The BOSS channel acts as a vehicle to remove the requirement to perform condition-checking operations when executing future branches, and to let branch outcomes to be calculated in advance of fetching future target branches. In embodiments, a pre-execute loop may be used to calculate branch outcomes for future instances of a target branch. The execution of the pre-execute loop is performed and made available in advance of a normal instruction execution sequence of the loop through a dedicated channel in hardware.

In embodiments, the BOSS channel may be used to allow software to pass a code sequence to hardware for branch pre-resolution. The code-sequence corresponds to pre-resolving a certain instance of the target branch, allowing the hardware to decide when to utilize the code sequence and for what instance or iteration of the target branch.

Figure 1:
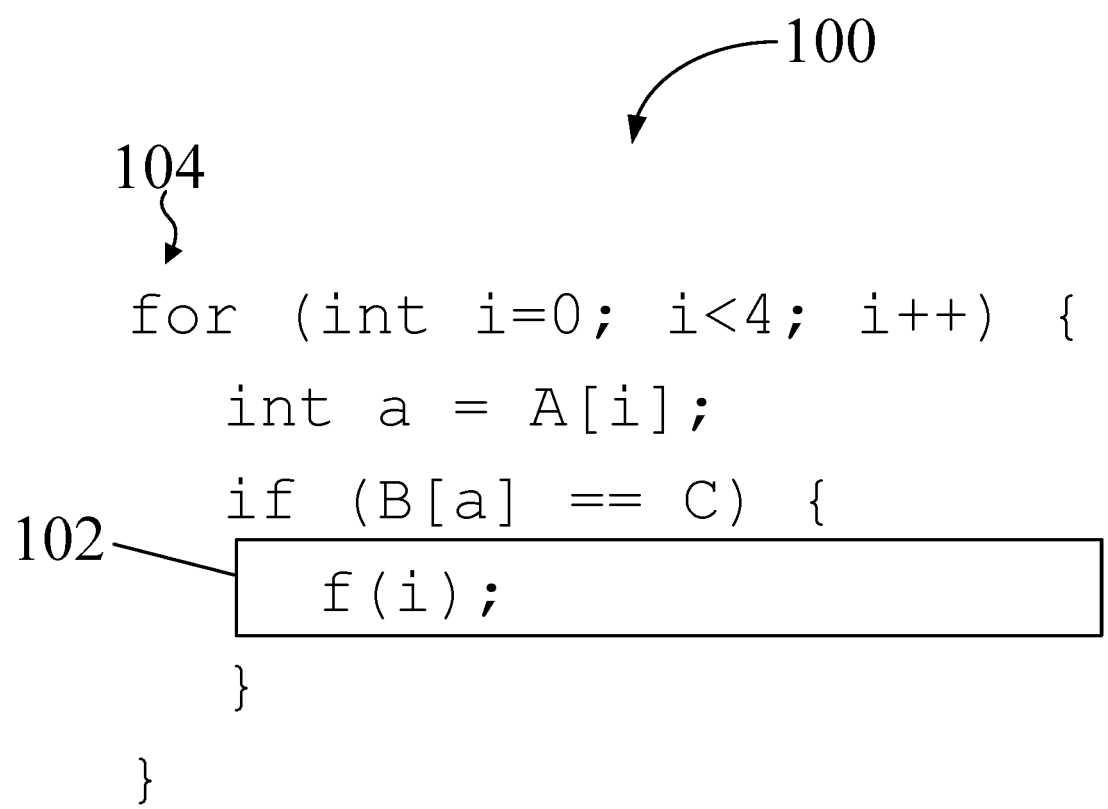
FIG. 1 illustrates exemplary computer instructions of a generic load-dependent branch, according to an embodiment.

FIG. 1 illustrates exemplary computer instructions 100 of a generic LDB 102, according to an embodiment that may be used to demonstrate the embodiments described herein. A LDB 102 is part of a software loop, in this example, a for loop 104. The branch instruction 102, in this example an if statement, will be executed once for each iteration of the loop 104. The branch instruction 102 is an LDB since the software must execute the statement, B [a]==C, in order to determine if the branch is taken and the statement f(i) is executed. If B [a] ==C is evaluated as TRUE then f(i) is executed. If B [a] ==C is evaluated as FALSE then f (i) is not executed and either the next iteration of loop 104 is executed or the loop ends. As will be understood by those of skill in the art, different loop instructions, branch instructions, and branch conditions may be used. For example, embodiments may include for, while, do while, and other loops. Branches may include if, if else, if then else, switch, etc. Branch conditions may be almost any logical or arithmetic expression that requires a calculation to determine the result.

In computer architecture, a branch predictor unit (BPU) is a digital circuit that attempts to predict if a branch will be taken or not taken, before the branch outcome is known definitively. The purpose of the BPU is to improve the flow of the instruction pipeline and the BPU plays a critical role in achieving high performance in almost all modern pipelined microprocessor architectures. BPUs may also perform branch target prediction which attempts to predicts the target of a branch before it is computed by decoding and executing the instruction itself. BPUs have difficulty predicting LDBs 102 since LDBs often do not show historical repetitions, neither locally (with respect to the same branch) nor globally (with respect to other branches). The effect of a BPU mis-predicting the branch is that the branch may take longer to resolve. If the mis-prediction leads to pipeline flushing and a cache miss, the latency may take even longer. The performance of a BPU and the prediction algorithms of the BPU may be expressed as a mis-prediction ratio; =number of mis-predictions/total number of prediction.

In embodiments, branch outcomes may be pre-computed and passed to the hardware in advance so when the LDB 102 is later executed, branch predictions are no longer needed for the target branch. In other words, embodiments pre-resolve LDBs using a combination of software and hardware and may provide a mis-prediction ratio of zero if branch outcomes are provided early enough.

Figure 2:
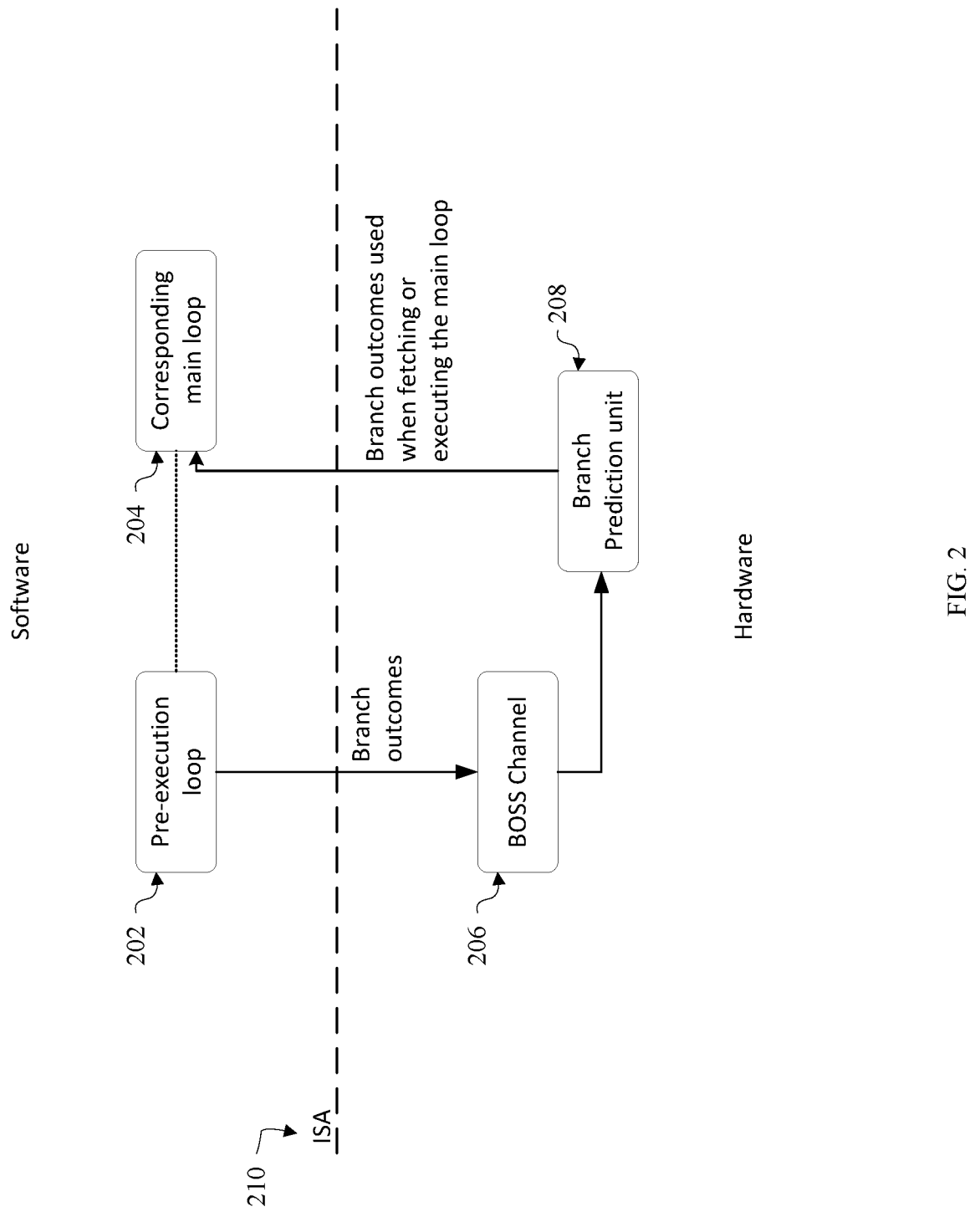
FIG. 2 includes a block diagram illustrating the software-hardware interface, and its relationship with the pre-execute loop, the main loop, and the branch prediction unit, according to an embodiment.

FIG. 2 illustrates a block diagram of the software-hardware interface, and the relationships between a pre-execute loop 202, a corresponding main loop 204, a BOSS channel 410 and a branch prediction unit 208, according to an embodiment. Dashed line 210 indicates the division between software and hardware in the Instruction Set Architecture (ISA). A software loop, such as loop 100 in FIG. 1 may be duplicated into a pre-execution loop 202 and a corresponding main loop 204. The main loop 204 may be the same or a modified version of the pre-execution loop 202. The pre-execution loop 202 may be executed sufficiently in advance of the main loop 204 being executed in order to determine the branch outcomes of the LDBs of the loop 100. Main loop 204 is the loop executed as part of the normal execution of the software that may use the predetermined branch outcomes to avoid or minimize the number of branch mis-predictions. Branch outcomes calculated during the execution of the pre-execution loop 202 may be sent to a BOSS channel 206 where a side-channel is incorporated in hardware to enable software to provide the branch outcome (taken or not-taken) a priori to the branch-predictor unit (BPU) 208 so that the BPU 208 no longer needs to predict the branch since the branch is pre-resolved by this software-hardware collaboration.

In embodiments, the branch outcomes from the execution of the pre-execution loop 202 may be passed to the hardware via specific instructions. The BPU of the processor may look up the outcome for every instance of the target branch when decoding, fetching, executing, and then committing LDBs of the main loop 204.

Embodiments of the architecture of FIG. 2 include two modes; a prediction-hint mode and a full-pre-execute mode as described herein. A difference between the two modes is that in the prediction-hint mode, the branch condition is calculated in the main loop 204, allowing the processor to use either the pre-calculated branch outcome of the pre-execution loop 202 or the branch outcome as calculated during the execution of the main loop 204. In the full-pre-execute mode, the pre-calculated branch outcome of the pre-execution loop 202 is used and the calculation of the branch condition in the main loop 204 is not repeated.

Figure 3:
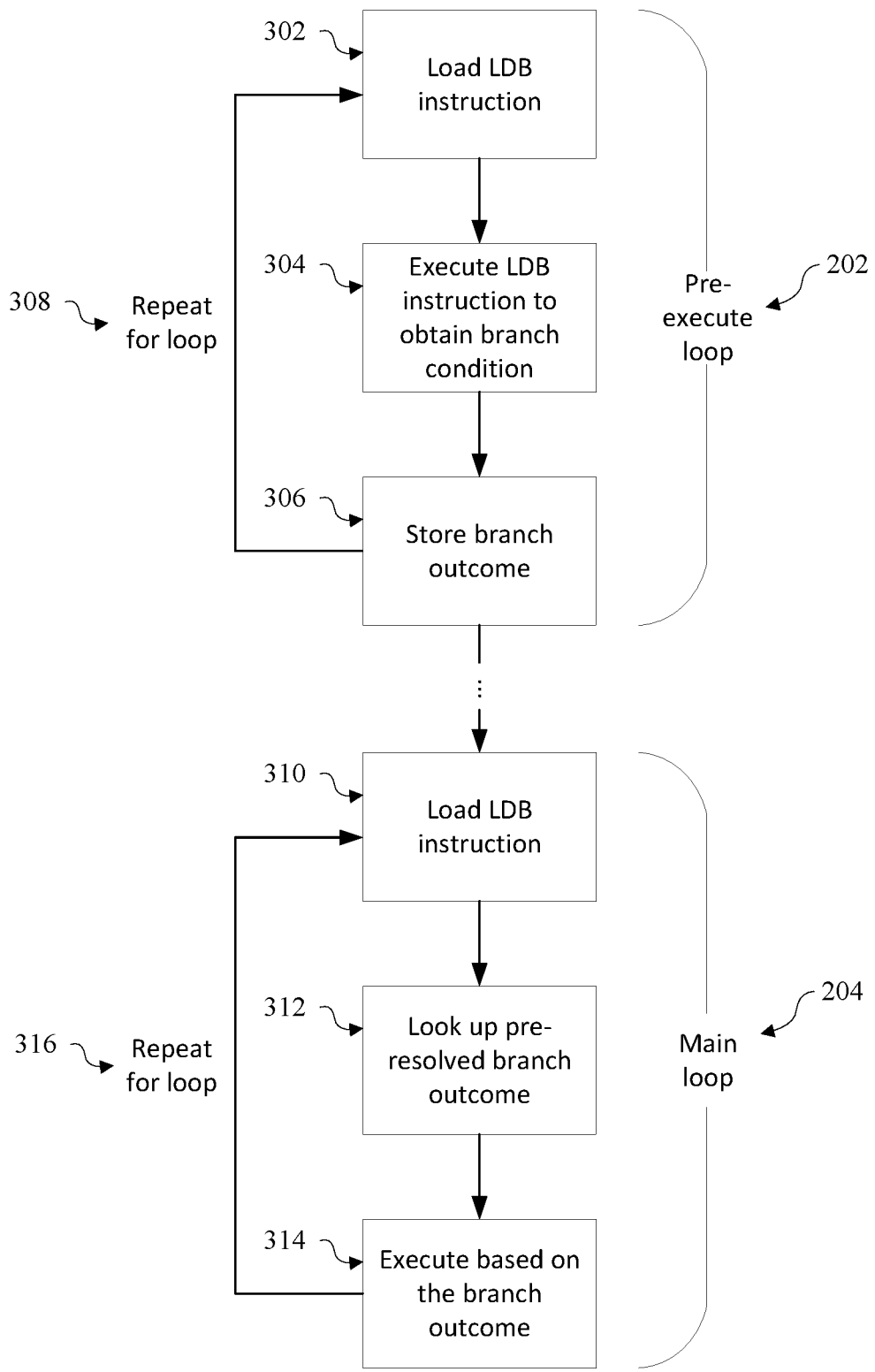
FIG. 3 illustrates a general method of predicting branch outcomes, according to an embodiment.

FIG. 3 illustrates a general method of predicting branch outcomes, according to an embodiment. Software loop 100 is used to produce a pre-execution loop 202 and a corresponding main loop 204. The creation of the pre-execution loop 202 and the main loop 204 from loop 100 may be done by a compiler or may be done dynamically at run time. The pre-execution loop 202 should be executed sufficiently before the execution of the main loop 204 to ensure that branch outcomes required by the main loop 204 are available during the execution of the main loop 204. In step 302 the LDB instruction of the pre-execute loop 202 is loaded. In step 304 the LDB instruction is executed to obtain the branch condition, which is evaluated to obtain the branch outcome. Branch outcomes may be indicated as taken or not-taken. In embodiments, a taken branch outcome may be represented by a '0' value. A not-taken branch outcome may be represented by a '1' value. As will be appreciated by those skilled in the art, other representations may also be uses, such as representing a taken branch outcome by a '1' and a not-taken branch outcome as a '0'. Similarly, a TRUE or FALSE value may be used to indicate the branch outcome. In step 306, the branch outcomes are stored for use by the main loop 204. In step 308, the loop is repeated until all iterations of the loop have been completed.

In step 310 of FIG. 3, which illustrates the general method, the sequence of operations within an iteration of main loop 204 specifically for resolving the LDB instruction and utilizing its pre-computed outcome begins with loading the LDB instruction. This occurs after any preliminary instructions within that iteration, such as the loading of a variable for the branch condition (e.g., int a=A[i]; as depicted in the exemplary main loop 204 of FIG. 4), have been executed. In step 312 a branch outcome for that iteration of the loop, pre-computed by the pre-execute loop 202, is looked up or loaded to determine the branch outcome. In step 314, execution may continue using the pre-computed branch outcome. In step 316, these steps are repeated for each iteration of the loop.

Figure 4:
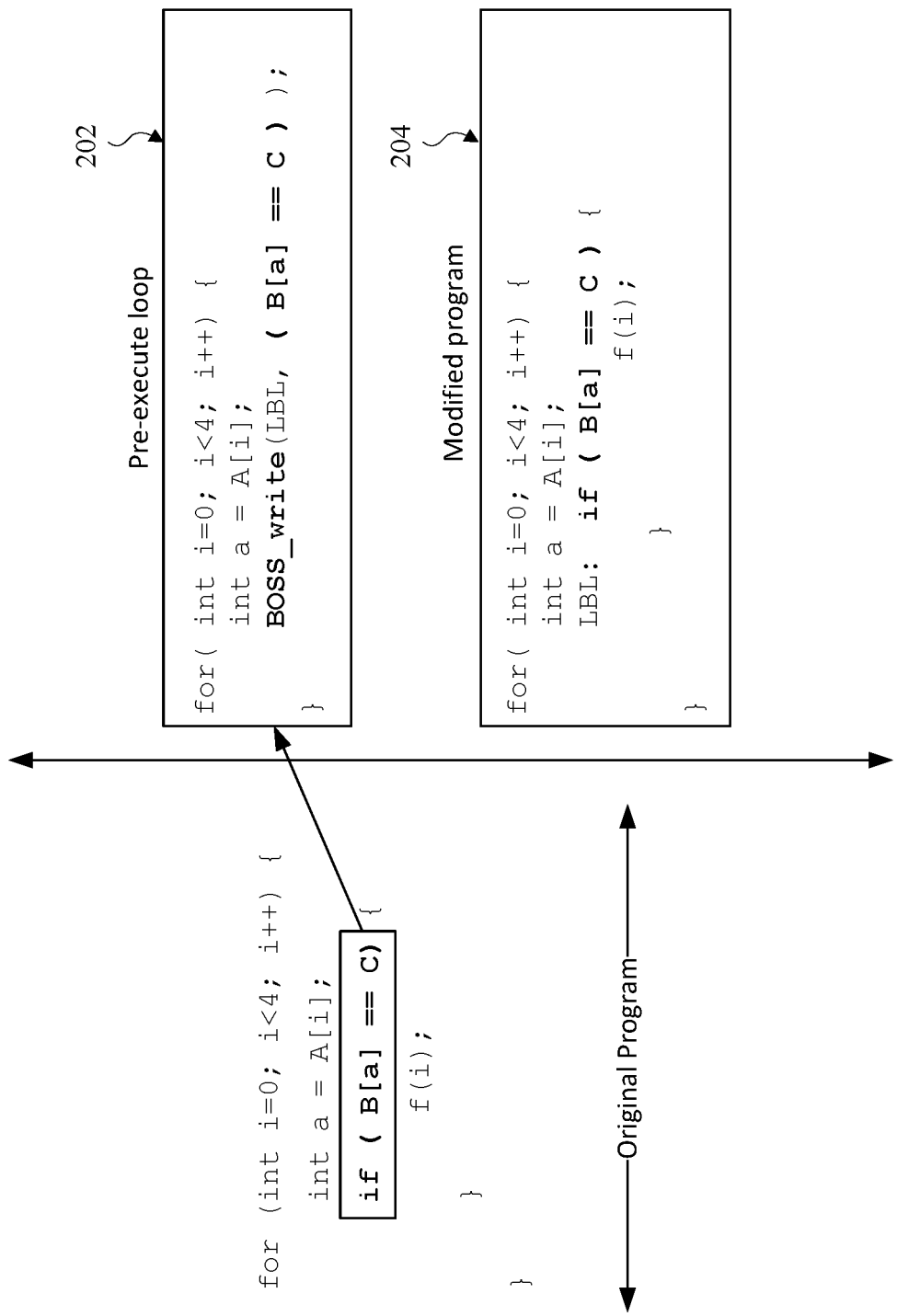
FIG. 4 illustrates exemplary computer instructions of a pre-execution loop and a corresponding main loop using a prediction-hint mode of operation, according to an embodiment.

FIG. 4 illustrates exemplary computer instructions of a pre-execution loop and a corresponding main loop using a prediction-hint mode of operation, according to an embodiment. In a prediction-hint mode of operation, branch-outcomes are passed to the BPU of the processor and the original main loop 204 remains intact. In other words, no modifications need be made to the instructions that are needed to compute the branch outcome in the main loop 204.

In embodiments, pre-execute loop 202 computes the conditions of the branch in the same order as the main loop 204, and passes them to hardware using a BOSS write instruction that allows the software access to the BOSS channel 206. A generalized BOSS write Boss_write(BrPC, Outcome) instruction may take two arguments. The first argument is a program counter (PC) of the branch-instruction of interest, BrPC. (Note that the label (LBL) of FIG. 4 represents the PC of the branch instruction corresponding to the designated branch statement.) The second argument is the Outcome, which is a binary value representing a hint of whether the branch will be taken ('1') or not-taken ('0'). As will be apparent to those skilled in the art, there are other alternate ways of allowing the software to access the hardware support.

In embodiments, the BOSS_write instruction may be divided into a BOSS_branch_pc instruction and a simplified BOSS_write instruction. When using the separate BOSS_branch_pc instruction and the simplified BOSS_write instruction, the BOSS_branch_pc instruction may be run only once and be used to pass the program counter (PC) of the target branch to the hardware where it may be assigned to a BOSS-ID. Then BOSS_write instructions may repeatedly be executed, and each time it writes a new branch-outcome to the BOSS-channel corresponding to that BOSS-ID. This approach is more efficient since it avoids passing the PC (which may be 64 bits long) every time an outcome is passed to the hardware.

Figure 5:
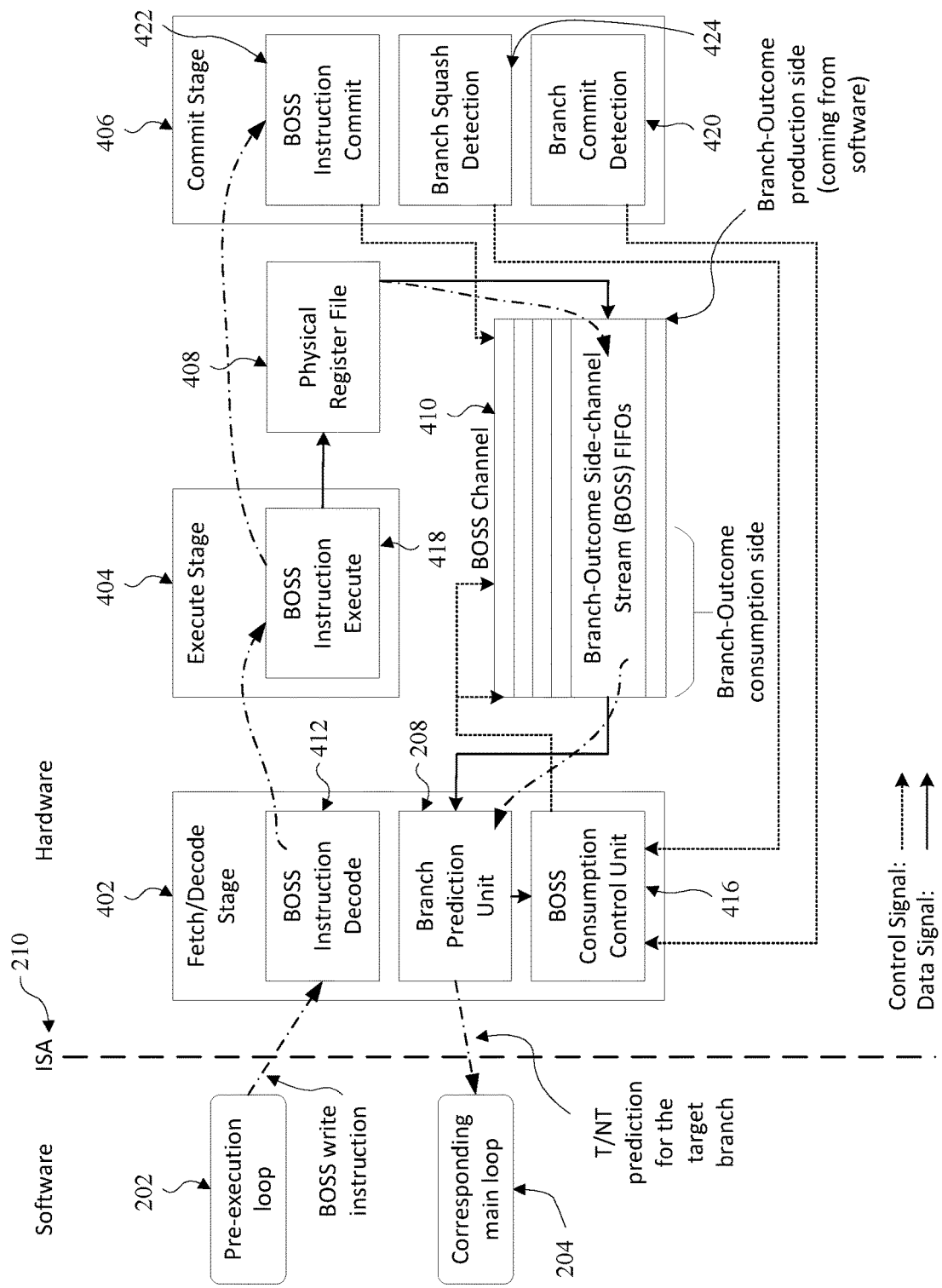
FIG. 5 includes a block diagram of computer hardware as it is used for branch prediction using a prediction-hint mode, according to an embodiment.

FIG. 5 includes a block diagram of computer hardware as it is used for branch prediction using a prediction-hint mode, according to an embodiment. The left-hand side of the ISA 210 line shows the software components; the pre-execute loop 202 and the main loop 204. The pre-execute loop 202 is executed before the main loop 204 to ensure that the required branch outcomes are stored in the branch-outcome memory (BOSS channel 410) before they are required by the main loop 204. In FIG. 5, dashed arrows indicate the flow of operations.

In the pre-execution loop 202, a branch outcome is calculated and a BOSS_write instruction is executed. A fetch/decode stage 402 of the processor fetches and decodes the BOSS_write instruction which is decoded in the BOSS instruction decode unit 412. Execute stage 404 then executes the BOSS_write instruction of the BOSS instruction execute 418 unit 418 which causes the branch outcome to be written to a physical register file 408. The BOSS instruction commit unit 422 of the commit stage 406 causes the BOSS_write instruction to be committed at which point the branch outcome is written to the BOSS channel 410 where it may be accessed by the main loop 204.

In the main loop 204, fetch/decode stage 402 reads the LDB instruction and the BPU 208 may predict the outcome of the LDB instruction (and all branches that it observes). When the BPU 208 receives an instance of the target branch, it consults the corresponding BOSS channel 410 and if it finds the branch-outcome there, this outcome may be used instead of the prediction from the conventional branch predictor.

In order to properly manage the entries in the BOSS channel, speculative as well as potentially out-of-order execution of the BOSS_write instruction as well as target-branch instruction need to be carefully considered. The "branch squash detection" 424 and "branch commit detection" 420 units in the commit stage 406 do the detecting and the "BOSS consumption control unit" 416 in the fetch/decode stage 402 may take that information into account to control the entries in the BOSS channel 410.

In the embodiment of FIG. 5, the branch-outcome memory is depicted as a BOSS channel 410 or a FIFO. However, it will be understood by those skilled in the art that other types of memory may also be used including a register file, RAM, cache memory, circular files, etc. A BOSS channel 410 may be a small buffer in the processor to store the pre-computed branch-outcomes up until they are consumed by the BPU.

Figure 6:
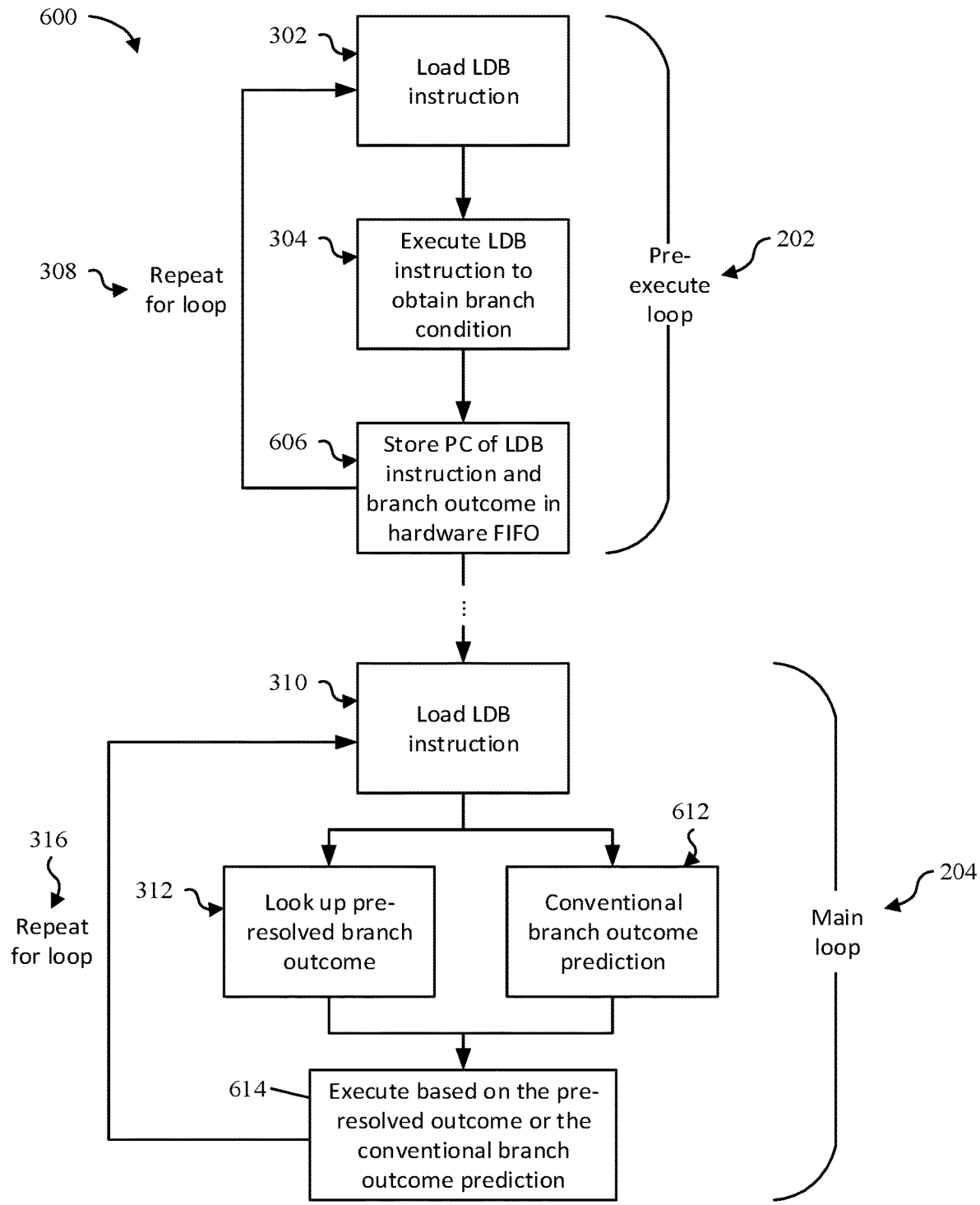
FIG. 6 illustrates a method of predicting branch outcomes using a prediction-hint mode, according to an embodiment.

FIG. 6 illustrates a method 600 of predicting branch outcomes using a prediction-hint mode, according to an embodiment. Software loop 100 is used to produce a pre-execution loop 202 and a corresponding main loop 204. The creation of the pre-execution loop 202 and the main loop 204 from loop 100 may be done by a compiler or may be done dynamically at run time. The pre-execution loop 202 should be executed sufficiently in advance of the execution of the main loop 204 to ensure that branch outcomes required by the main loop 204 are available during the execution of the main loop 204. In step 302 the LDB instruction of the pre-execute loop 202 is loaded. In step 304 the LDB instruction is executed to obtain the branch condition, which is executed to obtain the branch outcome. Branch outcomes may be indicated as taken or not-taken. In embodiment, a taken branch outcome may be represented by a '0' value. A not-taken branch outcome may be represented by a '1' value. As will be appreciated by those skilled in the art, other representations may also be uses, such as representing a taken branch outcome by a '1' and a not-taken branch outcome as a '0'. In step 606, the program counter (PC) of the LDB and the branch outcomes are stored for use by the main loop 204. In step 308, the loop is repeated until all iterations of the loop have been completed.

In step 310 the execution of main loop 204 commences when the LDB instruction is loaded. In step 312 a branch outcome for that iteration of the loop, pre-computed by the pre-execute loop 202, is read, retrieved, or loaded to determine the branch outcome. As well, in step 612, the branch outcome is obtained utilizing conventional branch outcome predictions as determined by the BPU 208. In step 614, execution continues and may use the pre-computed branch outcome or the conventional branch outcome prediction. In step 316, these steps are repeated for each iteration of the loop.

Figure 7:
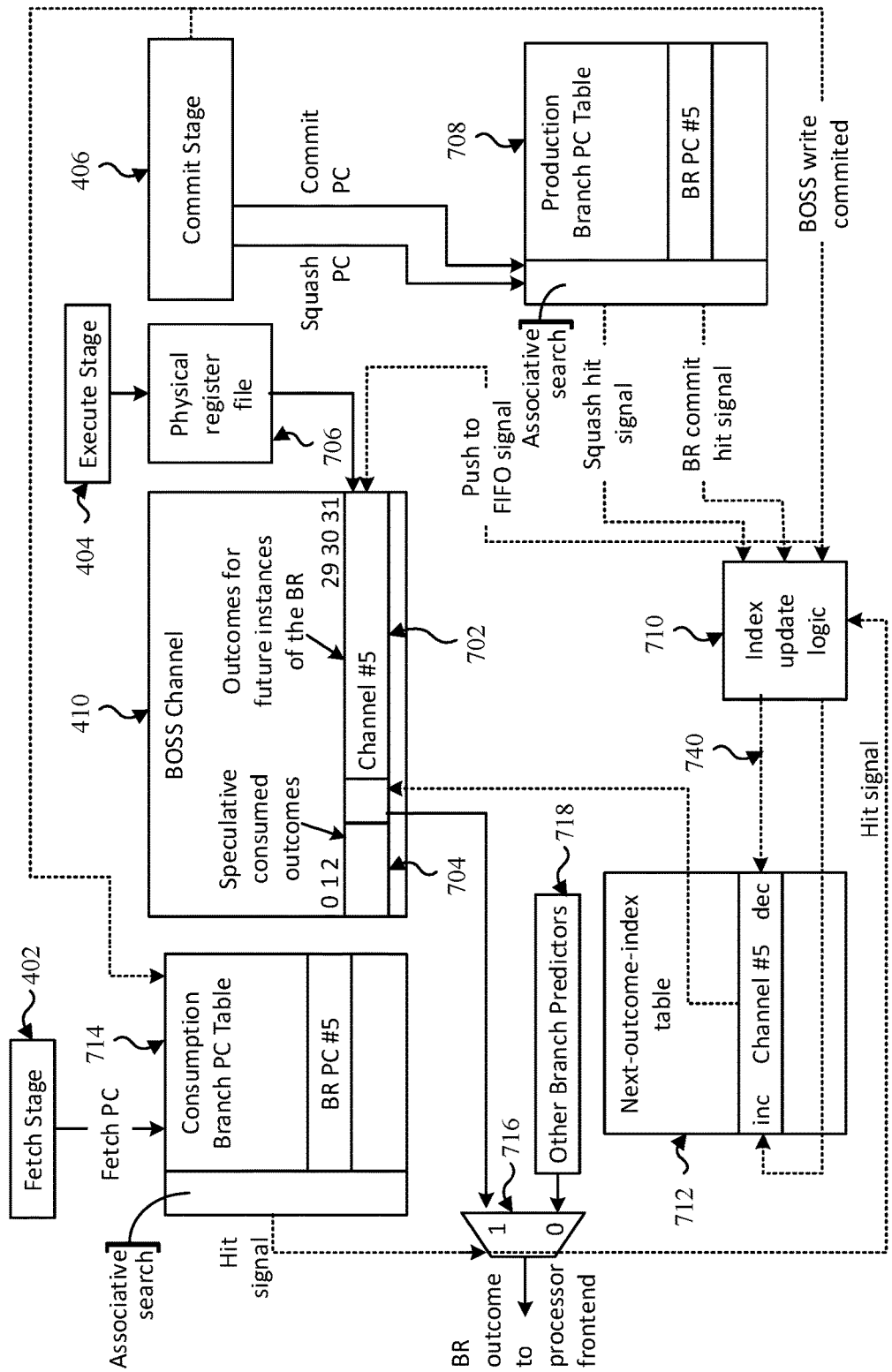
FIG. 7 includes a detailed view of a micro-architecture used for branch prediction using a prediction-hint mode, according to an embodiment.

FIG. 7 includes a detailed view of a micro-architecture used for branch prediction that may be used for implementing a prediction-hint mode, according to an embodiment. When executing the pre-execution loop 202, a dedicated instruction referred to herein as a BOSS_write instruction designates the PC of its target branch instruction. This PC is identified in the commit stage 406 when the BOSS_write is to be retired, and the corresponding production Branch PC Tables 708 are updated accordingly. In the execute stage 404, a BOSS_write instruction causes the computed branch outcome to be written to a physical register file 706, rather than to the BOSS channel 410. In the commit stage 406, the BOSS_write instruction is committed which includes the branch outcome being written to the next entry of the BOSS channel 410. In embodiments BOSS channel 410 may be implemented using a FIFO memory however, the BOSS channel 410 may be implemented as any small buffer in the processor that stores the pre-computed branch-outcomes up until they are consumed by the BPU. Each entry of BOSS channel 410 includes several sections including speculative consumed outcomes 704 and outcomes for future instances of the branch 702. BOSS channel 410 may incorporate pointers or other means to track positions for reading and writing and include flags to indicate the remaining capacity of the BOSS channel 410 or if it is partially full or full.

When executing the main loop 204, the PC of fetched instructions are sent to the consumption branch PC table 714 box which contains the list of PCs of the branch instructions previously registered with the system via a BOSS_write operation. The PC may be associatively searched in the table and if a hit occurs (i.e., the PC is found in the table), then the instruction is an instance of a BOSS target branch, and hence, the corresponding BOSS channel 410 entry may be consulted to obtain the branch-outcome (As an example, FIG. 7 assumes this PC corresponds to BOSS channel 410 channel #5). A next-outcome-index table 712, may be used to designate which entry in the channel should be read. If valid, that value is obtained and used as the branch outcome while the conventional branch-predictors 718 are bypassed by the multiplexer 716. An index update logic 710 box can be responsible for adjusting or maintaining the next-outcome-index 740 for the BOSS channel 410. The depending on a fetch, commit, or squash of a target branch instruction, or a commit of a BOSS_write instruction, this index 740 may be updated by the index update logic 710 to always point to the next element to be consumed.

In embodiments utilizing a prediction-hint mode, the pre-execute loop 202 provides the branch outcomes in advance and passes them to the BPU 208 for consumption. Thus, if the pre-execute loop 202 is available early enough in advance, hard-to-predict LDBs can be predicted accurately, and mis-prediction ratio may potentially be reduced to 0%.

Figure 8:
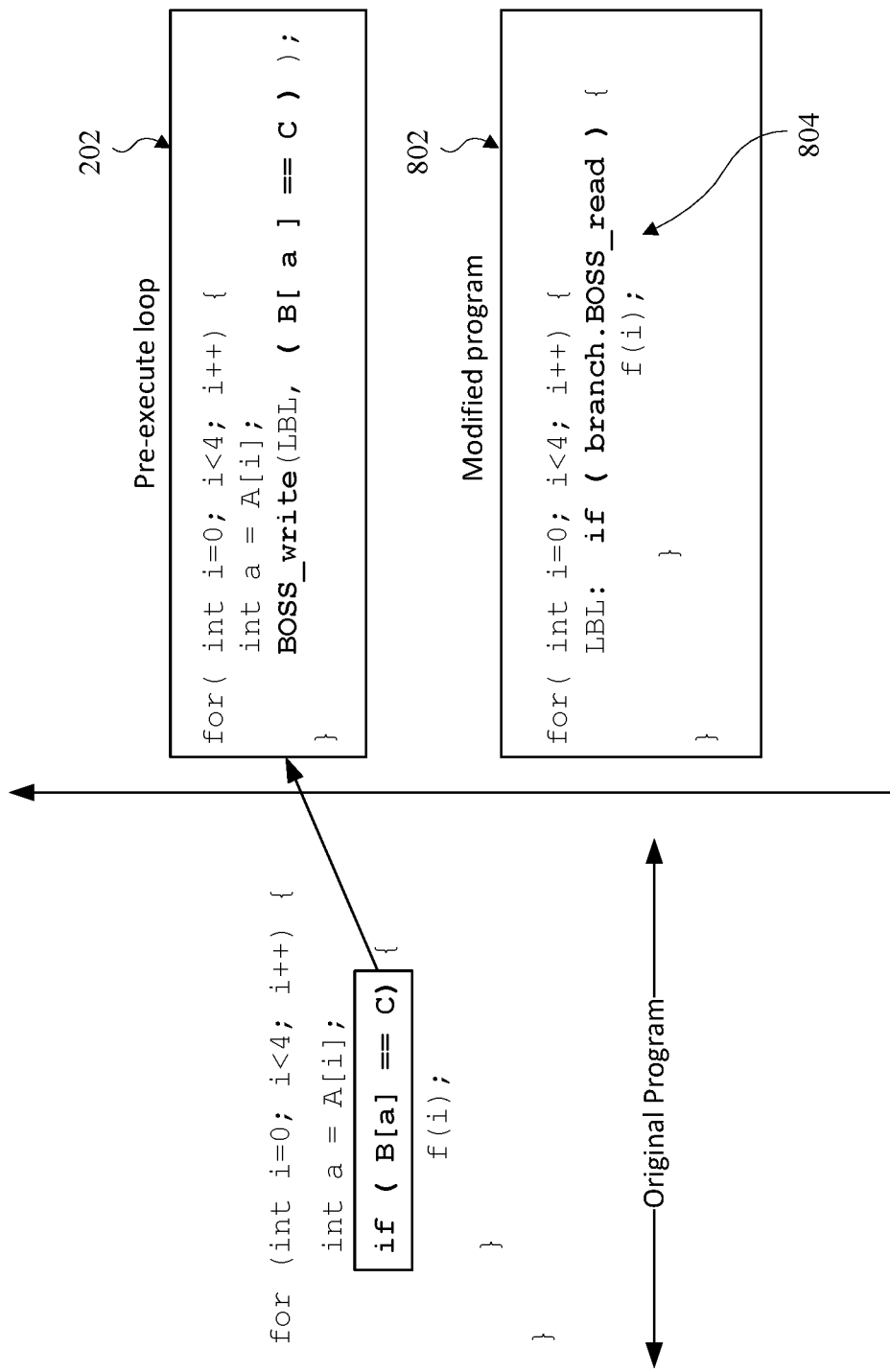
FIG. 8 provides exemplary computer instructions that illustrates a pre-execution loop and a corresponding main loop for embodiments using a full pre-executed mode.

FIG. 8 provides exemplary computer instructions that illustrates a pre-execution loop and a corresponding main loop for embodiments using a full pre-executed mode. Note that in the prediction-hint mode, the conditions of the branch are evaluated twice; once in the pre-execute loop 202, and once more in the main loop 204, resulting in an overhead for executing redundant instructions. In full pre-execute mode, the latter requirement to evaluate the branch condition is removed by allowing the branch condition to come directly from the BOSS channel 410. To enable the operation of the full pre-execute mode a new conditional branch instruction, which may be referred to as a branch. BOSS_read 804, is added to the instruction-set of the processor. In embodiments, the semantics of the branch. BOSS_read 804 instruction may be branch. BOSS_read<LBL>. The instruction causes the processor to branch to the target address <LBL>if the BOSS channel indicates that the branch is to be taken. I.e., if the value read from BOSS stream is "TAKEN".

In embodiments, a C language representation of how a branch.BOSS_read 804 instruction may be used in a main loop 802 where the branch condition, B [a] C, is replaced with a branch.BOSS_read 804 instruction. Thus, in a full-pre-execute mode, not only the prediction of the target branch, but also its execution may be done using a BOSS channel.

Figure 9:
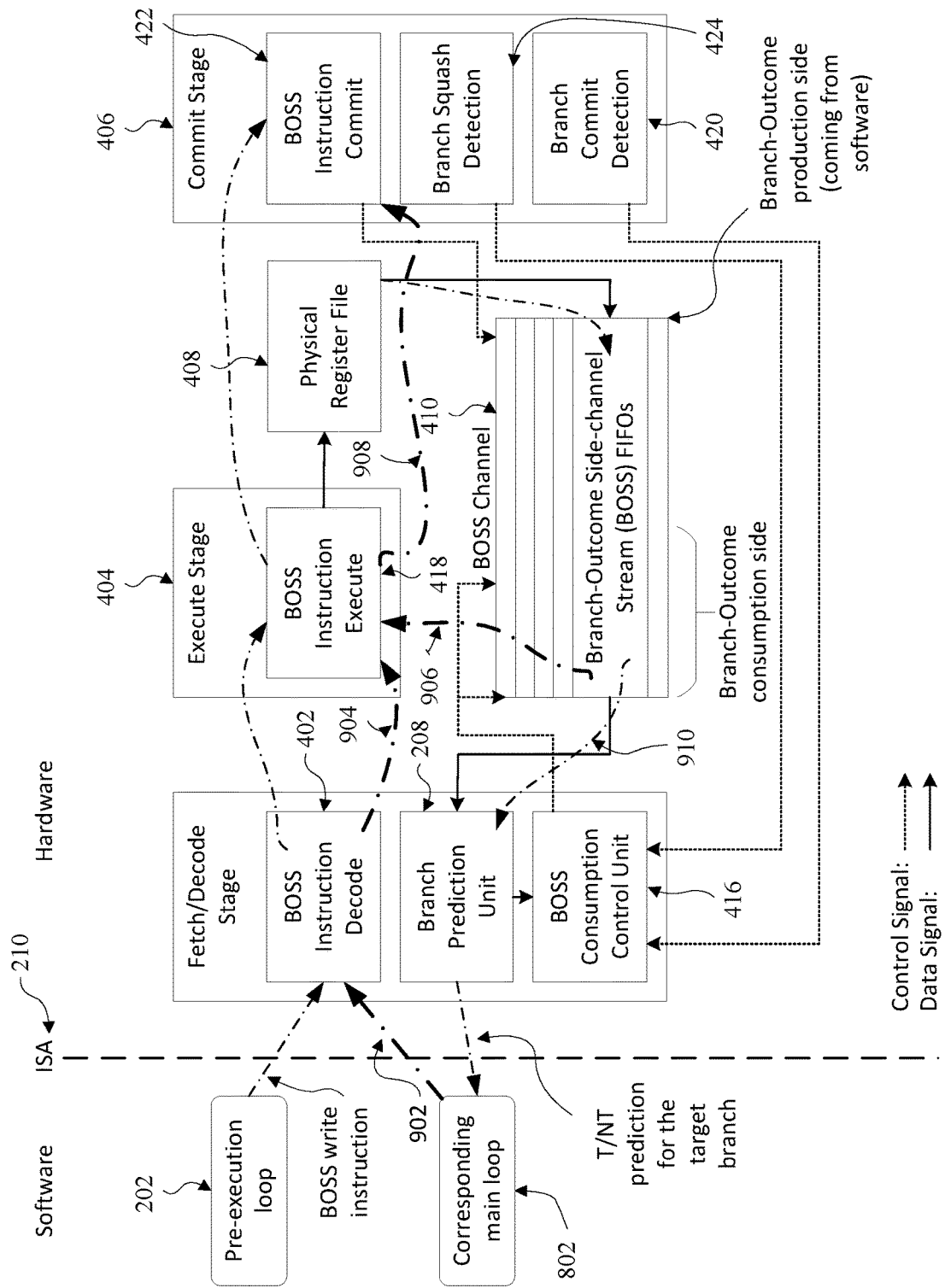
FIG. 9 includes a block diagram of computer hardware that may be used for branch prediction using a full pre-execute mode, according to an embodiment.

FIG. 9 includes a block diagram of computer hardware that may be used for branch prediction using a full pre-execute mode, according to an embodiment. In this embodiment the main loop is as illustrated in FIG. 8 and the branch condition, B [a] C, and the instructions solely used for its computation, int a=A [i], have been replaced with a branch.BOSS_read 804 instruction. Steps of methods of this embodiment that differ from the embodiment of FIG. 5 are shown by thickened arrows 902, 904, 906, and 908. Hardware components of this embodiment may remain as illustrated in FIG. 5. To implement the full pre-execute mode, a new instruction, branch.BOSS_read is added to the main loop 802 as illustrated in FIG. 8. As the main loop 802 is executed, when the LDB is executed it reads the status of its condition from the BOSS channel 410. However, in some cases this may be only a speculative execution of the target branch, the corresponding element in the BOSS channel 410 is not released up until the branch instance is retired at the commit stage. A difference between embodiments using the prediction-hint mode and embodiments using the full pre-execute mode is related to the execution of the main loop. When using the prediction-hint mode, the BPU 208 is the consumer of predetermined branch outcomes, whereas in the full-pre-execute mode both the BPU 208 and the BOSS instruction execute unit (BEU) 418 may be consumers of the predetermined branch outcomes. In practice, the BPU 208 is always ahead (see arrow 910 vs. arrow 906) of execution compared to the BEU 418 when executing LDB instruction. Therefore, the BPU 208 is reading younger branch-outcomes from the BOSS channel 410, and the BEU 418 follows it later in time. In embodiments, separate pointers may be used to designate which entry to read from. In either embodiment, release of the entry in BOSS channel 410 is done only when the corresponding branch instance is retired at the commit stage 406. Therefore, full pre-execute mode does not need a deeper BOSS channel than the prediction-hint mode.

An advantage of embodiments using the full-pre-execute mode over the prediction-hint mode is the removal of redundant instructions which can help reduce the instruction overhead of the BOSS channel. Since the instructions that include the load operations and compute the condition of the load-dependent branch are already executed in the pre-execute loop, the branch. BOSS_read 804 mechanism avoids repetition and reduces the number of instructions that must be executed.

Figure 10:
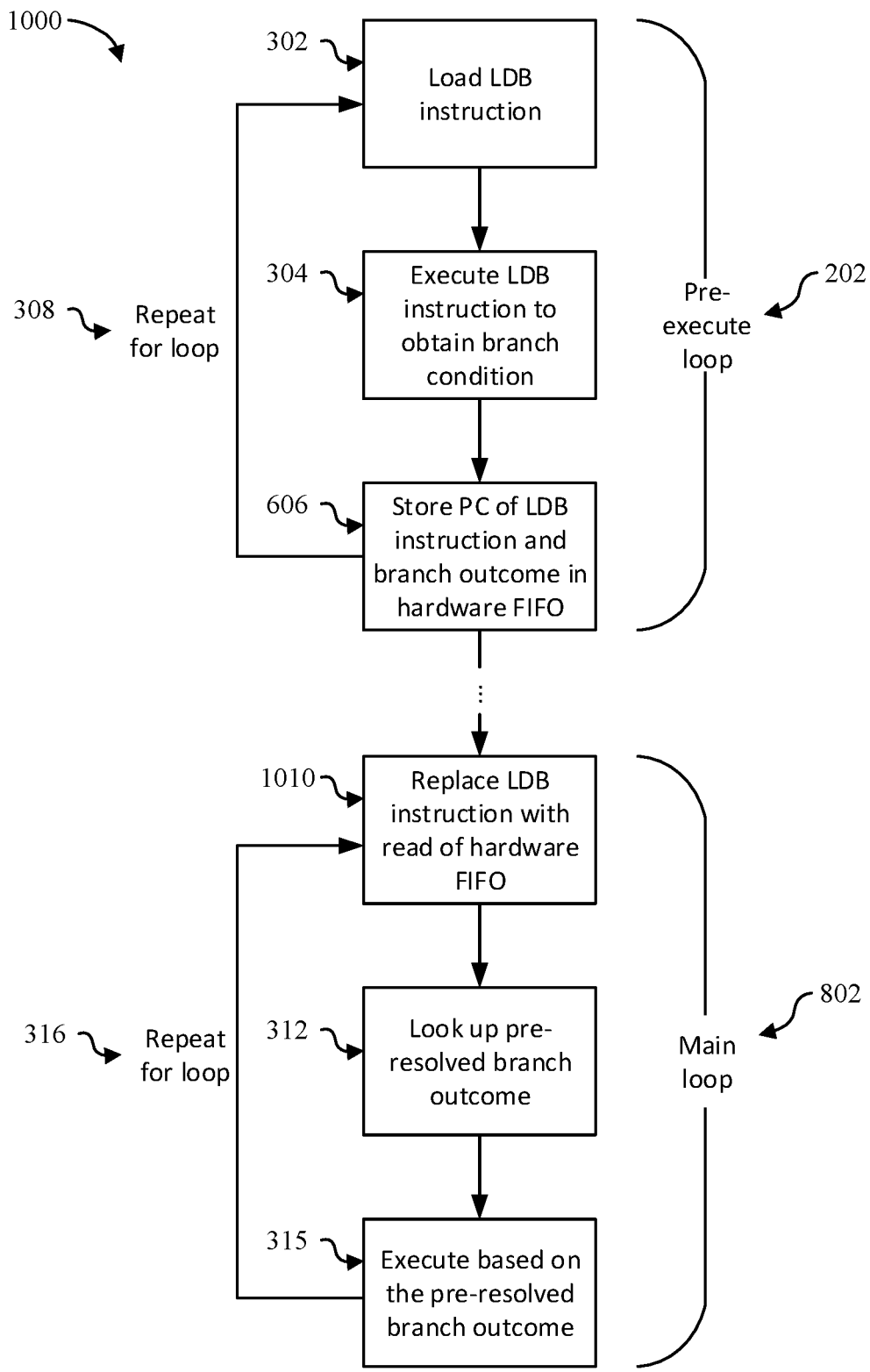
FIG. 10 illustrates a method of predicting branch outcomes using a full pre-execute mode, according to an embodiment.

FIG. 10 illustrates a method 1000 of predicting branch outcomes using a full pre-execute mode, according to an embodiment. Software loop 100 is used to produce a pre-execution loop 202 and a corresponding main loop 802. The creation of the pre-execution loop 202 and the main loop 802 from loop 100 may be done by a compiler or may be done dynamically at run time. The pre-execution loop 202 should be executed sufficiently in advance of the execution of the main loop 802 to ensure that branch outcomes required by the main loop 802 are available during the execution of the main loop 802. In step 302 the LDB instruction of the pre-execute loop 202 is loaded. In step 304 the LDB instruction is executed to obtain the branch condition, which is executed to obtain the branch outcome. Branch outcomes may be indicated as taken or not-taken. In embodiment, a taken branch outcome may be represented by a '0' value. A not-taken branch outcome may be represented by a '1' value. As will be appreciated by those skilled in the art, other representations may also be uses, such as representing a taken branch outcome by a '1' and a not-taken branch outcome as a '0'. In step 606, the program counter (PC) of the LDB and the branch outcomes are stored for use by the main loop 204. In step 308, the loop is repeated until all iterations of the loop have been completed.

In step 1010 the execution of main loop 204 commences when the LDB instruction is replaced with an instruction, such as a branch. BOSS_read 804 instruction to perform a read of the branch outcome from BOSS channel 410. In step 312 a branch outcome for that iteration of the loop, pre-computed by the pre-execute loop 202, is accessed or loaded to determine the branch outcome. In step 315, execution continues and may use the pre-computed branch outcome. In step 316, these steps are repeated for each iteration of the loop.

Figure 11:
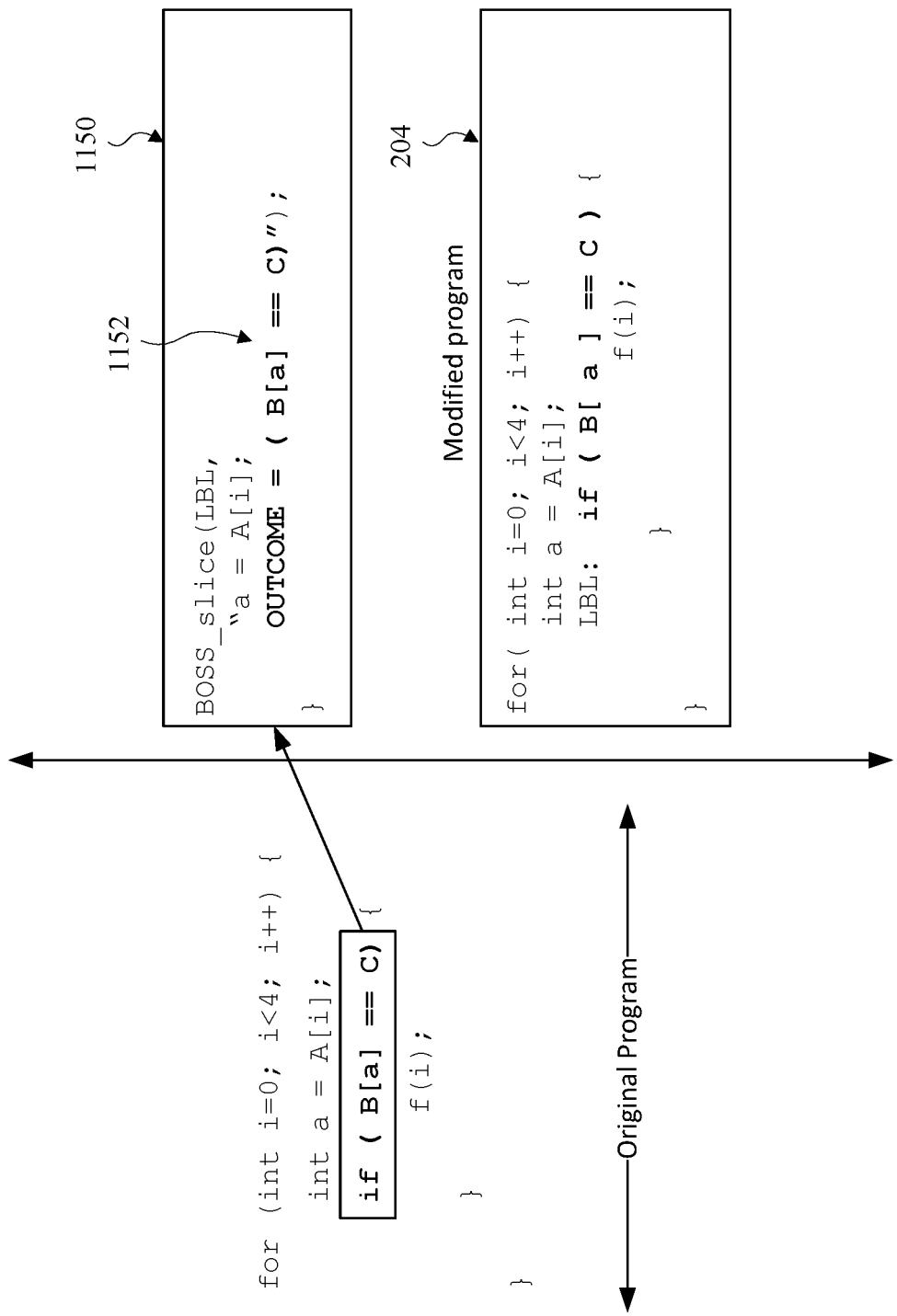
FIG. 11 provides exemplary computer instructions that illustrate a symbolic representation of the software for embodiments using a HW-driven mode, according to an embodiment.

FIG. 11 provides exemplary computer instructions that illustrate a symbolic representation of the software using a hardware (HW)-driven mode, according to an embodiment. In these embodiments, a pre-execute loop is not used. Instead, an instruction sequence 1152 for each iteration of a loop is provided to the hardware by the software. Then the hardware can determine when to run the instruction-sequence 1152 and for which instance of the target branch. An instruction, referred to as a BOSS slice (BrPC, codeToComputeOutcome) instruction herein, may be used to transfer the instruction sequence 1152 to hardware. The BOSS slice instruction may include arguments such as BrPC, Range, and codeToComputeOutcome. BrPC may be the PC of the branch-instruction of interest. The Range may represent the range of values that the loop counter may take. The codeToComputeOutcome argument may be the sequence of instructions that leads to computing the branch-outcome corresponding to a given iteration of the loop. Using the HW-driven mode, the loop counter may be represented by i, and the computed branch outcome may be designated by OUTCOME.

A key benefit of HW-driven mode is that the instruction overhead is effectively reduced, and use may be limited only to cases where it is beneficial. Although not all load-dependent branches turn out to be hard to predict, this is not known statically and thus for both previous modes, prediction-hint as well as full-pre-execute modes, the pre-execute loop must be provided and executed. Thus, if the LDB turns out not to be hard-to-predict, this entire pre-execute loop is not used and becomes overhead. The HW-driven mode leaves it to the hardware to determine at run-time if it is beneficial and execute selected iterations of the loop only if the target LDB is hard-to-predict in practice.

Figure 12:
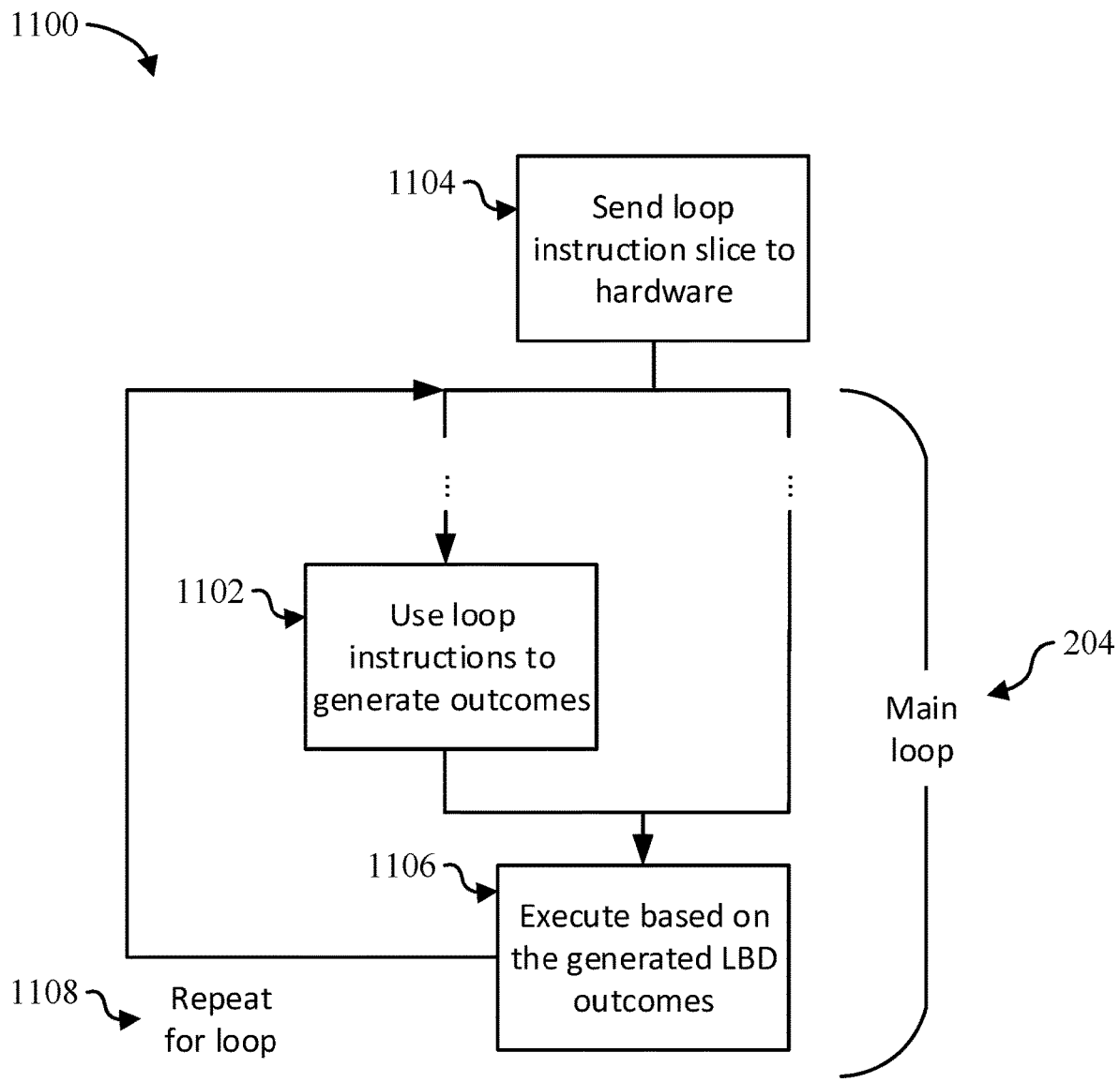
FIG. 12 illustrates a method of predicting branch outcomes using a hardware driven mode, according to an embodiment.

FIG. 12 illustrates a method 1100 of predicting branch outcomes using a hardware driven mode, according to an embodiment. In step 1104, a loop instruction slice is sent to the hardware using an instruction such as a codeToComputeOutcome 1152 instruction. At a later time, the main loop 204 is executed and for each iteration of the loop, in step 1102 the hardware may use the loop instruction slice to generate a respective LDB outcome. In step 1106 the branch may be executed based on the generated LDB outcomes. In step 1108, additional iterations of the loop may be performed.

Figure 13:
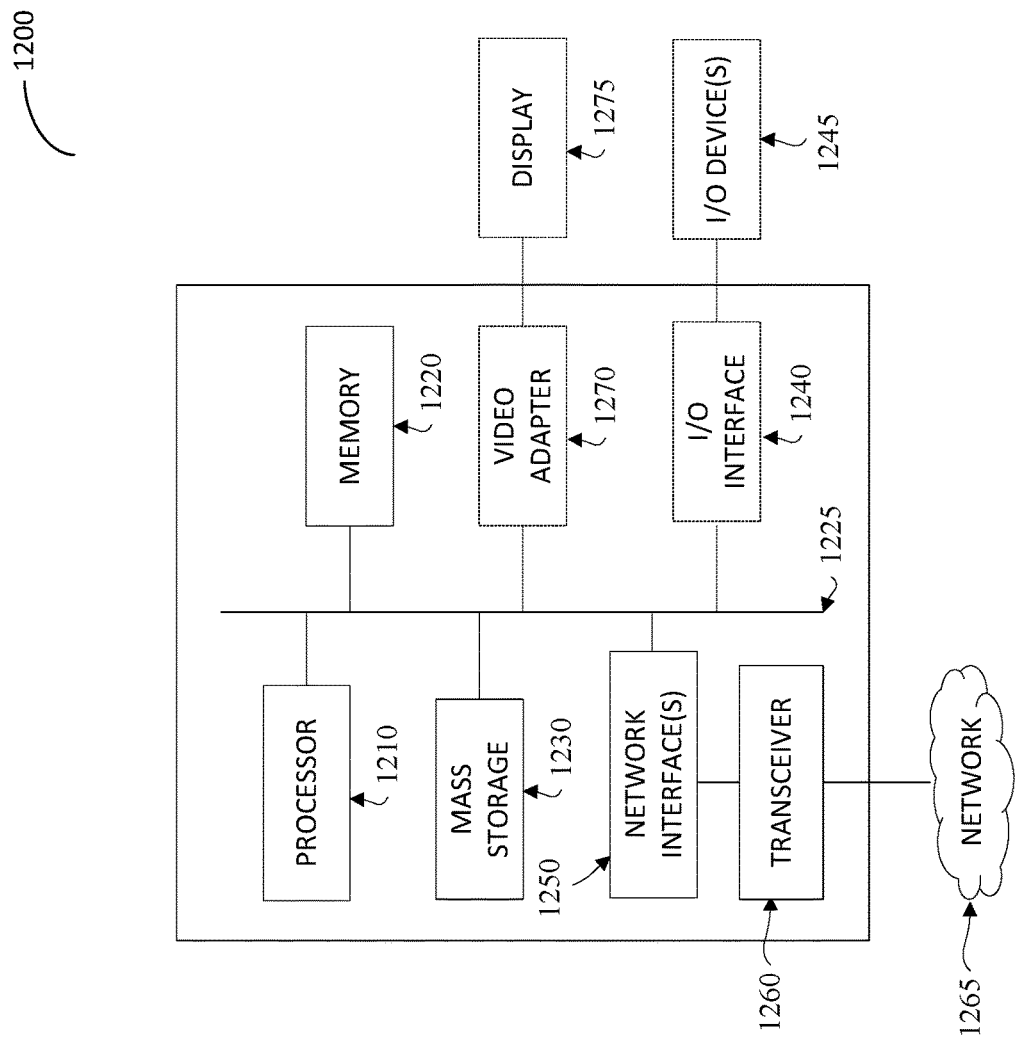
FIG. 13 illustrates a computing device that may be used to implement the methods as described herein, according to an embodiment.

FIG. 13 is a schematic diagram of a computing device 1200 that may perform any or all of operations of the above methods and features explicitly or implicitly described herein, according to different embodiments of the present invention.

As shown, the device includes a processor 1210, such as a central processing unit (CPU) or specialized processors such as a graphics processing unit (GPU) or other such processor unit, memory 1220, non-transitory mass storage 1230, I/O interface 1240, network interface 1250, video adaptor 1270, and one or more transceivers 1260, all of which are communicatively coupled via bi-directional bus 1225. The computing device 1200 may communicate, via the transceiver 1260, with a network 1265, which may be any type of wired or wireless network. Video adapter 1270 may be connected to one or more of display 1275 and I/O interface 1240 may be connected to one or more of I/O device 1245 which may be used to implement a user interface. According to certain embodiments, any or all of the depicted elements may be utilized, or only a subset of the elements. Further, the device 1200 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

In embodiments, processor 1210 may contain one or more processor cores including BPUs, hardware BOSS channels, branch-outcome memory (FIFOs), and other hardware elements of apparatus and systems described herein. Processor 1210 may also contain any hardware elements required to perform any of the methods as described herein The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program instructions and software. According to certain embodiments, the memory 1220 or mass storage 1230 (e.g. referred to as a non-transitory computer-readable or machine-readable medium) may have recorded thereon statements, instructions, and software executable by the processor 1210 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing non-transitory signals readable by a machine, for controlling the operation of a computer according to the method of the technology and/or to structure some or all of its components in accordance with the system of the technology.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

The invention claimed is:

1. A method of branch prediction, the method comprising:
executing a pre-execute software loop by:
loading a series of instructions leading to a load dependent branch (LDB) instruction, the series of instructions including a load instruction,
executing the load instruction to obtain a variable associated with a branch condition of the LDB instruction,
computing a branch outcome of the LDB instruction based on the variable associated with the branch condition of the LDB instruction, the branch outcome being a pre-resolved branch outcome, and
storing the pre-resolved branch outcome of the LDB instruction to a register file, wherein the pre-resolved branch outcome is subsequently committed from the register file to a branch-outcome memory; and,
after completing the pre-execute software loop, executing a main software loop corresponding to the pre-execute software loop, the main software loop comprising a statement to be executed in accordance with the pre-resolved branch outcome, the executing the main software loop including:

loading the load instruction,
reading the branch outcome from the branch-outcome memory, and,
when the pre-resolved branch outcome is TAKEN, executing the statement.

2. The method of claim 1 wherein the pre-resolved branch outcome is provided to the branch-outcome memory through a branch-outcome write instruction, the branch-outcome write instruction including a program counter of the LDB instruction and the pre-resolved branch outcome.

3. The method of claim 1 wherein the branch-outcome memory is a first in, first out (FIFO) memory.

4. The method of claim 1 wherein the pre-resolved branch outcome is written using a branch-outcome side-channel stream (BOSS) write instruction, the BOSS write instruction including a program counter of the LDB instruction and the pre-resolved branch outcome.

5. The method of claim 1 wherein the pre-resolved branch outcome is written using a first branch-outcome side-channel stream (BOSS) write instruction for transferring a program counter of the LDB instruction and a second BOSS write instruction for transferring the pre-resolved branch outcome.

6. The method of claim 1 wherein the pre-resolved branch outcome is read using a branch-outcome side-channel stream (BOSS) read instruction, the branch BOSS read instruction including a label of a branch target address to be used when the LDB instruction is taken.

7. A processor core comprising:
an instruction fetch and decode stage including a branch prediction unit (BPU);
an execution stage;
a register file;
a commit stage; and
a branch-outcome memory;
wherein the processor core is configured so that in response to receiving a branch-outcome write instruction the processor core writes a branch outcome to the branch-outcome memory;
wherein the BPU is configured so that in response to the instruction fetch and decode stage receiving a load dependent branch (LDB) instruction, the BPU reads the branch outcome from the branch outcome memory, the processor core using the branch outcome to predict the LDB instruction; and
wherein the branch outcome is first stored in the register file before being written to the branch-outcome memory by the commit stage.

8. The processor core of claim 7 wherein the commit stage comprises a branch squash detection circuit and a branch commit detection circuit used to detect the LDB instruction.

9. The processor core of claim 8 wherein the instruction fetch and decode stage further comprises a branch outcome consumption control circuit.

10. The processor core of claim 7 wherein the branch-outcome write instruction comprises a program counter of a target LDB instruction.

11. The processor core of claim 7 wherein the branch-outcome write instruction comprises two instructions including a first instruction for transferring a program counter (PC) of the LDB instruction and a second instruction for transferring the branch outcome.

12. A method of branch prediction, the method comprising, in a processor core:
executing a pre-execute software loop by:
loading a series of instructions leading to a load dependent branch (LDB) instruction, the series of instructions including a load instruction,
executing the load instruction to obtain a variable associated with a branch condition of the LDB instruction,
computing a first branch outcome of the LDB instruction based on the variable associated with the branch condition of the LDB instruction, the first branch outcome being a pre-resolved branch outcome, and
storing the pre-resolved branch outcome of the LDB instruction to a register file, the pre-resolved branch outcome to be written and committed to a branch outcome memory;
and
after completing the pre-execute software loop, executing a main software loop corresponding to the pre-execute software loop, the main software loop comprising a statement to be executed in accordance with the pre-resolved branch outcome, the executing the main software loop including:
loading the load instruction,
accessing the branch outcome memory to read the pre-resolved branch outcome and, during execution of the main software loop, also computing a second branch outcome of the LDB instruction based on the branch condition of the LDB instruction;
wherein the main software loop subsequently proceeds by:
when the pre-resolved branch outcome is present in the branch outcome memory and when the pre-resolved branch outcome is TAKEN, executing the statement based on said pre-resolved branch outcome,
and
otherwise, determining whether to execute the statement based on said second branch outcome.

* * * * *